Figure 1:
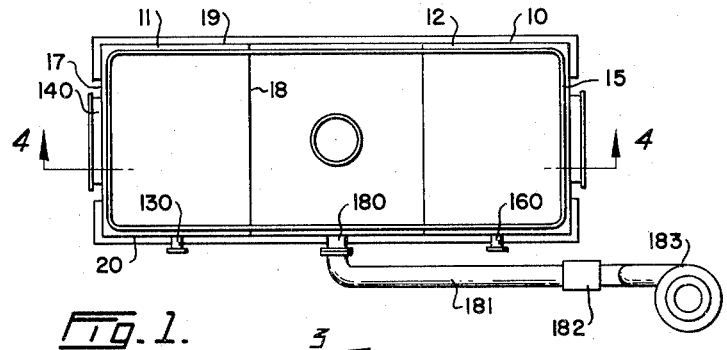

Sept. 22, 1964   F. E. MURRAY ET AL   3,150,211
GAS-LIQUID CONTACTING APPARATUS

Filed May 9, 1961   6 Sheets-Sheet 1

INVENTORS
FRANCIS EDWARD MURRAY
HENRY DAVID ZITKO
ROBERT HAMILTON WRIGHT
RONALD WOODWARD KLINCK

BY Featherstonhaugh & Co.
ATTORNEYS

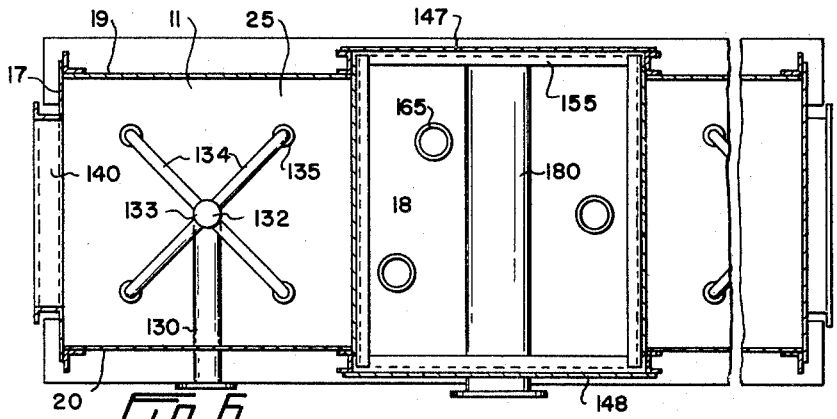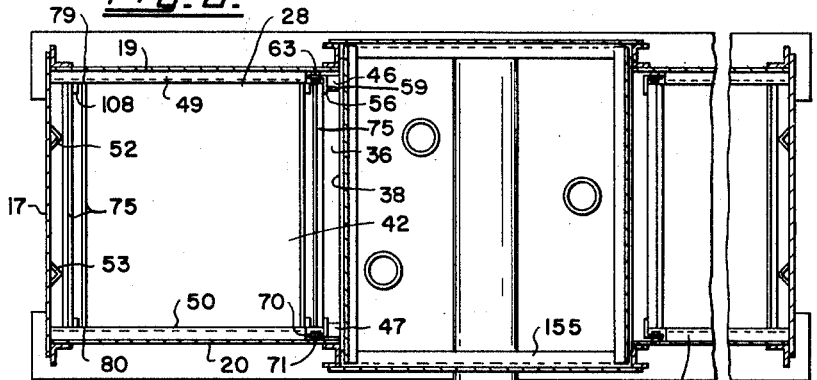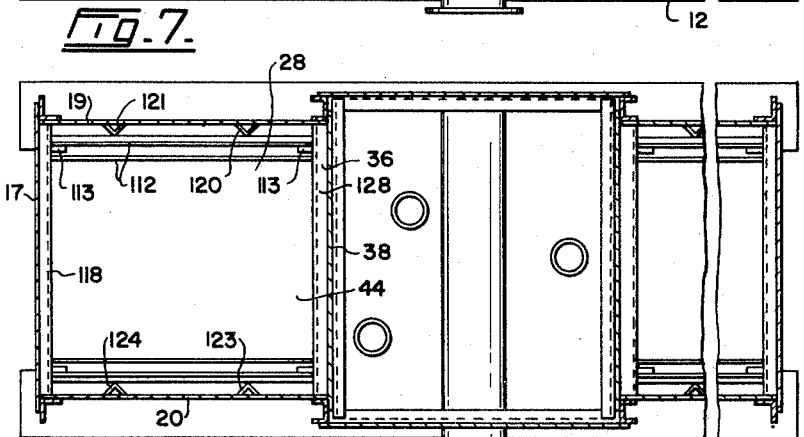

Sept. 22, 1964  F. E. MURRAY ET AL  3,150,211
GAS-LIQUID CONTACTING APPARATUS
Filed May 9, 1961  6 Sheets-Sheet 6
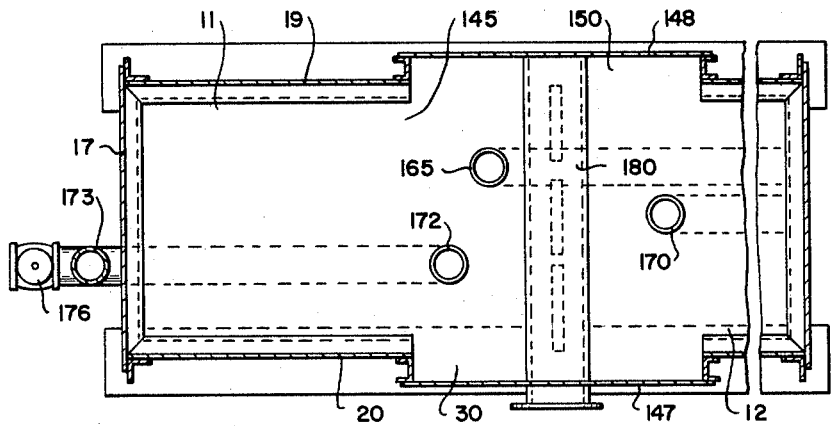
Fig. 9.
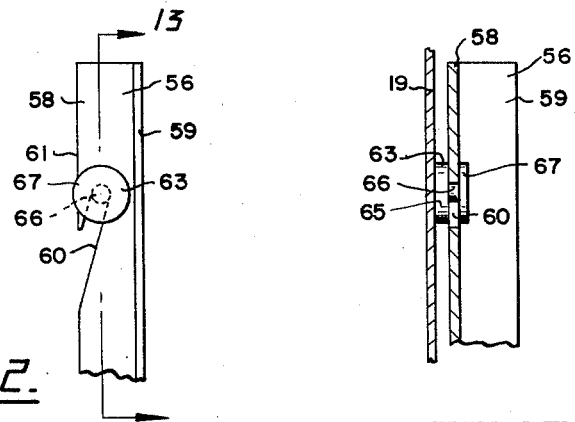
Fig. 12.
Fig. 13.
INVENTORS
FRANCIS EDWARD MURRAY
HENRY DAVID ZITKO
ROBERT HAMILTON WRIGHT
RONALD WOODWARD KLINCK
BY
Fetherstonhaugh & Co.
ATTORNEYS

United States Patent Office 3,150,211
Patented Sept. 22, 1964

3,150,211
GAS-LIQUID CONTACTING APPARATUS
Francis Edward Murray, Henry David Zitko, Robert Hamilton Wright, and Ronald Woodard Klinck, all of Vancouver, British Columbia, Canada, assignors to British Columbia Research Council, Vancouver, British Columbia, Canada
Filed May 9, 1961, Ser. No. 108,798
2 Claims. (Cl. 261—112)

This invention relates to apparatus for bringing a large volume of gas into intimate contact with a large volume of liquid in a comparatively small space.

This apparatus may be used for bringing any gas into intimate contact with a liquid, but it is primarily designed for bringing an oxygen-containing gas, such as air, with or without other gases, into contact with a liquid, such as black liquor, and it is an improvement over the apparatus illustrated and described in United States Patent No. 2,858,119, dated October 28, 1958.

The liberation by sulfate or kraft process mills of malodorous substances, such as hydrogen sulphide, organic mercaptans, and organic sulphides, even in small concentrations in air creates problems in the area in which the mill is located. The treatment and disposal of black liquor results in the release of malodorous substances, and the gases and vapors released from digesters in which wood chips are cooked with pulping chemicals are also obnoxious. Oxidation of black liquor prior to its evaporation and combustion according to standard practice serves to reduce materially the amount of malodorous substances released during these operations. This oxidation may be accomplished by bringing the black liquor into intimate contact with an oxygen-containing gas, such as air. Foul gases from the pulp process may be mixed with the oxygen-containing gases in order that the malodorous substances thereof are absorbed in the liquor.

The invention generally comprises a tower having a plurality of closely spaced vertically arranged plates on edge extending thereacross, said plates forming thin passages therebetween. The liquid, such as black liquor, is distributed on to the major surfaces of the plates at the upper edges thereof so that it flows downwardly over said plate surfaces. The gas, such as air with or without foul gases mixed therewith, is directed through the thin plate passages, usually in a downward direction. The liquid and gas are separately removed from the tower.

One feature of the present invention is the use of corrugated plates, with or without roughened surfaces, said corrugations preferably extending across the tower. These plates are arranged so that the corrugations of each plate fit into the corrugations of the next adjacent plate to form thin undulating passages therebetween. These corrugations not only increase the area of the flow surface in the tower, but they give the plates dimensional stability so that they can be placed closer together without support between the edges thereof than has heretofore been possible.

Another feature of the invention is the formation of the upper edges of the plates in such a way that the liquid distributed to said edges is directed on to both major surfaces of each plate.

Another advantage of this invention results from the arrangement of the plates in vertically disposed cubicles with the plates of each cubicle extending substantially at right angles to the plates of the next adjacent cubicle.

The invention also includes a novel mounting for the plates which permits them to be easily installed in and removed from their respective cubicles, and which makes it unnecessary to mount anything on the plates or to alter their original construction in any way.

The present contacting apparatus also includes a novel system for the disposal of foam created at the liquid discharge end of the tower.

The basic unit of the invention comprises a plurality of closely spaced nested corrugated plates in a cubicle or chamber, and the basic practical application of the invention comprises a tower having a plurality of vertically arranged cubicles containing groups of these plates. However, the invention is described herein in connection with a pair of towers which act as a unit and through which the liquid flows consecutively, the gas being taken off by a common exhaust system, as is any foam generated therein.

Figure 2:
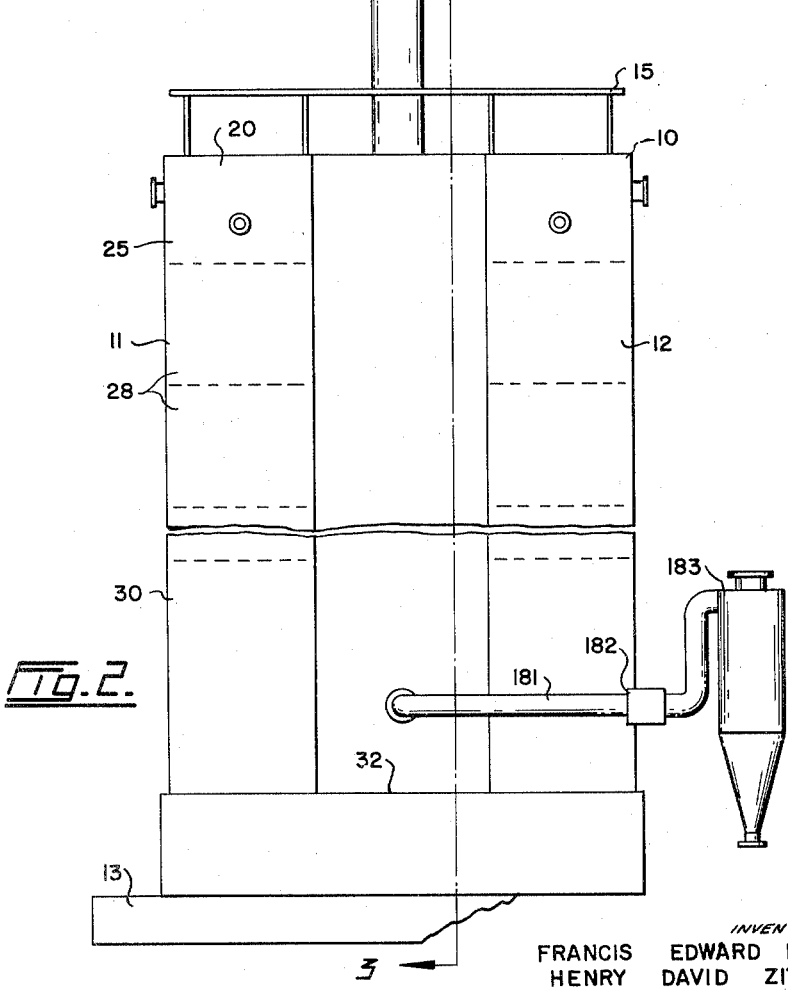
Figure 3:
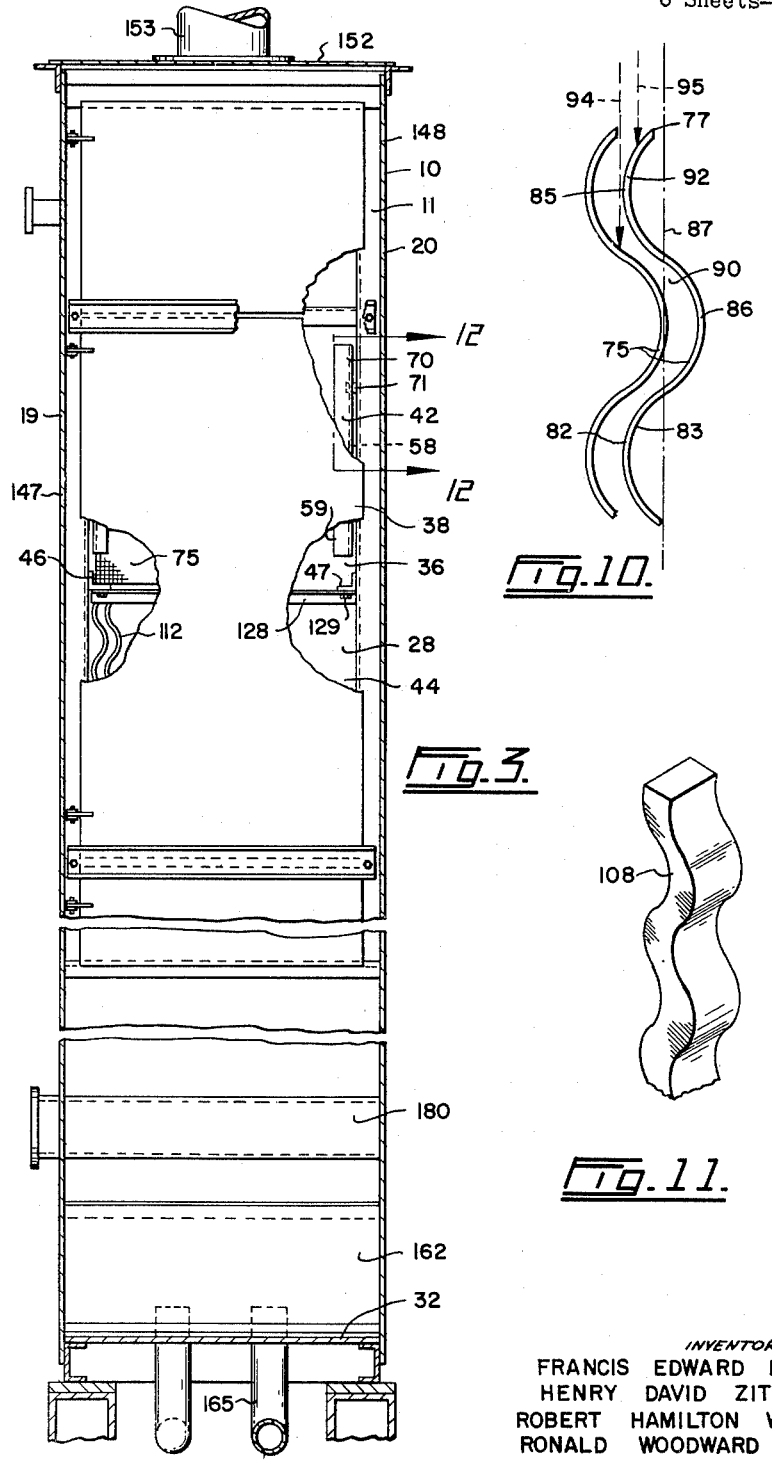
Figure 4:
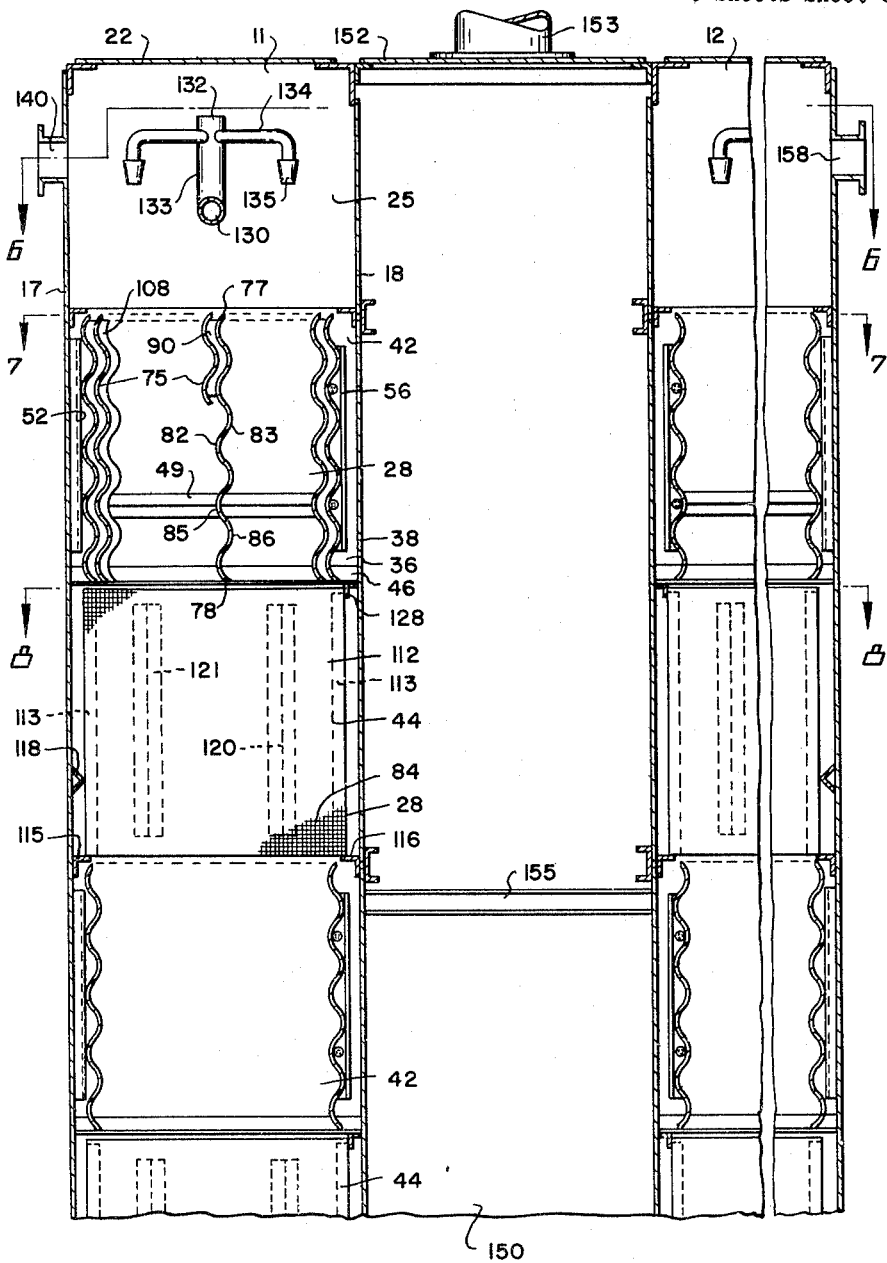
Figure 5:
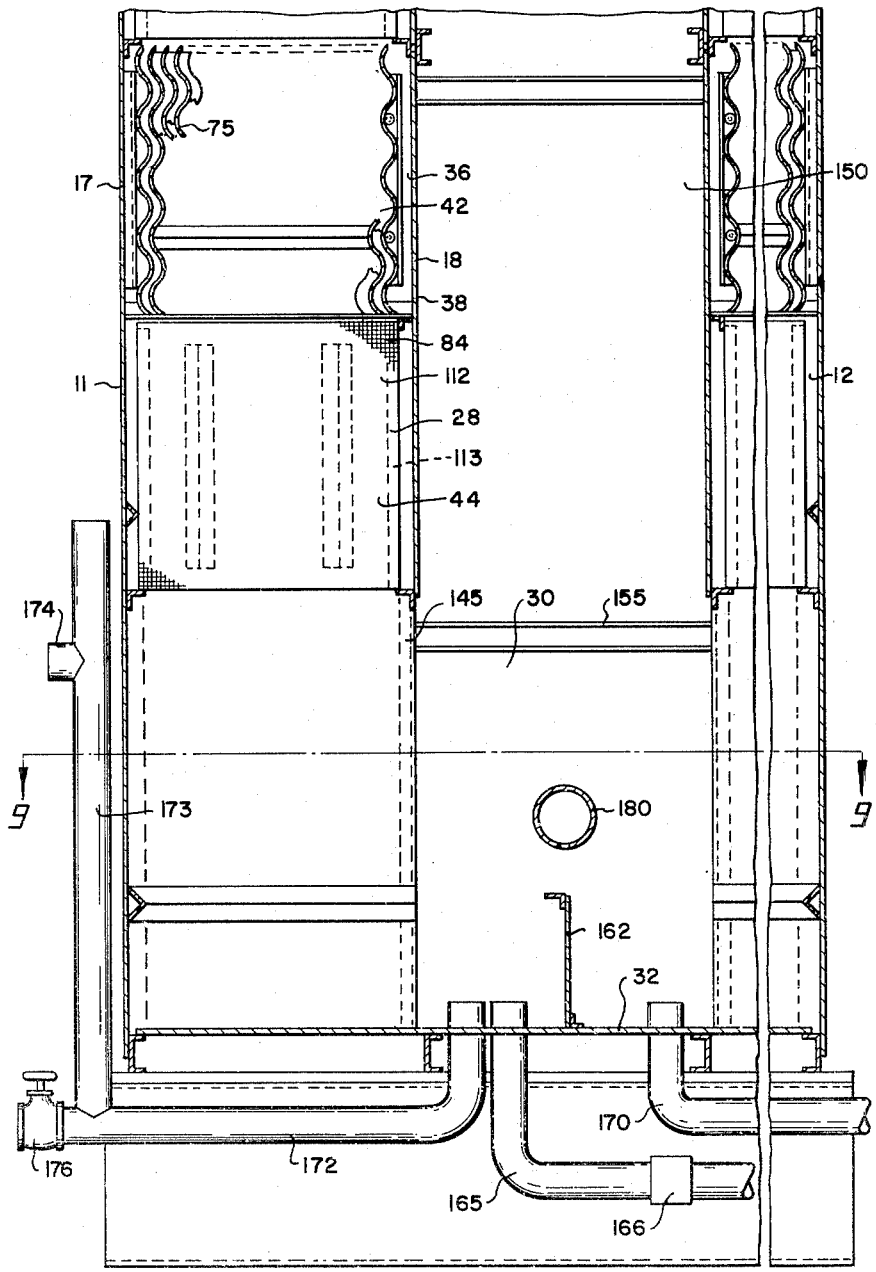

A preferred form of the invention is illustrated in the accompanying drawings, in which, FIGURE 1 is a plan view of a two-tower form of gas-liquid contacting apparatus, FIGURE 2 is a side elevation of the apparatus, FIGURE 3 is a vertical section taken on the line 3—3 of FIGURE 2, FIGURE 4 is a vertical section taken on the line 4—4 of FIGURE 1, illustrating the upper part of the apparatus, FIGURE 5 is a vertical section similar to FIGURE 4, but illustrating the bottom part of the apparatus, FIGURE 6 is a horizontal section through a tower on the line 6—6 of FIGURE 4, FIGURE 7 is a horizontal section taken on the line 7—7 of FIGURE 4, FIGURE 8 is a horizontal section taken on the line 8—8 of FIGURE 4, FIGURE 9 is a horizontal section taken on the line 9—9 of FIGURE 5, FIGURE 10 is an enlarged vertical section through two corrugated plates of the apparatus, FIGURE 11 is a perspective view of a spacer strip used between the corrugated plates, FIGURE 12 is a vertical fragmentary section taken on the line 12—12 of FIGURE 3, and FIGURE 13 is a vertical section taken on the line 13—13 of FIGURE 12.

Referring to the drawings, the gas-liquid contacting apparatus 10 includes a pair of vertical towers 11 and 12 mounted on a suitable base, such as a concrete slab 13. These towers are spaced apart, and may be connected together at their upper ends by suitable bridging 15. As towers 11 and 12 are identical, only one, namely tower 11, will now be described in detail.

Tower 11 includes a substantially rectangular defining wall including front and back walls 17 and 18, and opposed side walls 19 and 20. The top of the tower is closed by a cover 22. Tower 11 is divided vertically from its upper end down into a distributor chamber 25, one or more cubicles 28, there being ten such cubicles in this example, a sump 30, and a sill 32 which rests upon slab 13.

Entrances are provided in back wall 18 for cubicles 28, and for the sake of convenience, an entrance 36 is provided for each pair of cubicles 28, each of said entrances being normally closed by a door 38 removably or hingedly mounted on wall 18. As the cubicles are arranged in pairs, and each pair is the same as the other pairs, one cubicle pair only will now be described in detail.

Each pair of cubicles 28 includes an upper cubicle 42 and a lower cubicle 44. Horizontal brackets 46 and 47 extend inwardly along the bottom of cubicle 42 from entrance 36 on walls 19 and 20. Horizontal spacers 49 and 50 extend along walls 19 and 20 above brackets 46 and 47. A pair of spaced vertical spacers 52 and 53 are mounted on the inner surface of tower wall 17, and a vertical retaining clip 56 is removably mounted on wall 19 near cubicle entrance 36 in any convenient manner.

In this example, the clip 56 is in the form of an angle bracket having a leg 58 lying parallel to wall 19 and a leg 59 projecting into the cubicle from said wall, see FIGURES 4, 7, 12 and 13. Clip leg 58 has upwardly inclined slots 60 extending inwardly from its free edge 61, said slots opening outwardly of said edge. Two anchor buttons 63 are mounted on wall 19. Each button has a spacer section 65 projecting outwardly from wall 19, and a neck 66 extends outwardly from this spacer section and has a head 67 on its outer end. Clip 56 is such that it is mounted on anchor buttons 63, at which time the clip slots 60 fit over the button necks 66.

A clip 70, which is the same as clip 56, is removably mounted on anchor buttons 71 mounted on and projecting inwardly from tower wall 20 near cubicle entrance 36 and in line with clip 56, see FIGURE 7.

A plurality of packing plates 75 are removably mounted in upper cubicle 42, said plates being closely spaced and standing on edge. Each plate 75 is horizontally corrugated, and formed of any suitable non-corrosive material, such as asbestos and cement. Each plate 75 has upper and lower edges 77 and 78, and side edges 79 and 80, as well as opposite major surfaces 82 and 83. It is preferable, but not absolutely necessary, to slightly roughen both of said major surfaces as indicated at 84. This may be accomplished by impressing a fine screen into the plate surfaces when the material of the plate is soft. The plate is formed with alternately arranged corrugations 85 and 86 projecting laterally from the plate on opposite sides of a substantially vertical centre line 87 between the plate major surfaces. Plates 75 are nested so that the corrugations of each plate fit into the corrugations of the next adjacent plate to form thin undulating passages 90 therebetween. The uppermost corrugation 92 of each plate terminates near centre line 87 to form the upper edge 77 of said plate, see FIGURE 10. With this arrangement, liquid directed into the upper end of thin passage 90 will strike the adjacent major surfaces 83 and 82 of adjacent plates, as indicated by arrows 94 and 95 in FIGURE 10. Narrow and thin spacer strips 108 are placed between adjacent plates 75 at both sides thereof, one of said strips being illustrated in FIGURE 11. Each spacer strip is corrugated to correspond to the corrugations of plates 75 so that they fit snugly therebetween.

It is a very simple matter to pack upper cubicle 42 with plates 75. These plates extend between and rest on supporting brackets 46 and 47. The innermost plate with reference to entrance 36 of the cubicle is pressed against vertical spacers 52 and 53. Then spacers 108 are positioned at the side edges of the plates. Thus, strips 108 are alternated with plates 75 until the required number are inserted into the cubicle. Then clips 56 and 70 are placed on anchor buttons 63 and 71 to hold the outermost plate and, consequently, the other plates and the spacers in position within the cubicle. When the clips are pressed down on the anchor buttons, said clips are shifted inwardly of the cubicle, owing to the incline of the slots, such as slots 60 therein, and thereby press the plates and spacer strips together. Leg 59 of clip 56 and the corresponding leg of clip 70 press against plates 75 at this time as shown in FIGURE 7.

Lower cubicle 44 has a plurality of closely spaced, corrugated packing plates 112 mounted therein. These plates are exactly the same as plates 75 described above, and they are separated by spacer strips 113 similar to strips 108. Cubicle 44 has horizontal supporting brackets 115 and 116 extending along the bottom thereof and mounted on tower walls 17 and 18. A horizontal spacer 118 is mounted on and extends along wall 17 above bracket 115. Inner and outer vertical spacers 120 and 121 are mounted on tower wall 19 near walls 17 and 18. Similarly, inner and outer spacers 123 and 124 are mounted on the inner surface of wall 20 near walls 17 and 18.

In order to pack lower cubicle 44, plates 112 with spacer strips 113 therebetween are inserted therein on edge and rest on supporting brackets 115 and 116, the inner edges of said plates bearing against spacer 118. The two outermost plates at the sides of this cubicle bear against spacers 120–121 and spacers 123–124. When the plates are all in the cubicle, a transverse clip 128 is removably connected to the lower surfaces of supporting brackets 46 and 47 at the bottom of upper cubicle 42 in any suitable manner, such as by bolts 129, see FIGURE 3.

By referring to FIGURES 4, 5, 7 and 8, it will be seen that plates 75 of each upper cubicle 42 are arranged substantially at right angles to plates 112 of the next lower cubicle 44. It will also be seen that the lower edges 78 of plates 75 are just above the upper edges of plates 112, and that there are no obstructions between these plate edges.

The corrugations of packing plates 75 and 112 give these plates dimensional stability. In other words, the corrugations keep the plates from bowing towards each other and, therefore, the plates can be put very close together without any need of spacers therebetween other than at their side edges. As a result of this, it is not necessary to put anything between the plates that will obstruct the flow of liquid therebetween, and it is not necessary to attach anything to the plates or to cut or shape them other than to impart the corrugations thereto during manufacture.

Suitable means is provided in distributor chamber 25 for distributing liquid to the major surfaces at the upper edges of the packing plates in the uppermost cubicle 28 in the tower. In this example, a pipe 130 extends through side wall 20 near the top thereof into chamber 25. The inner end of this pipe is connected to a distributor 132 which consists of a hollow hub 133 having a plurality of branch pipes 134 radiating therefrom, each of these pipes having a downwardly-directed nozzle 135 on its outer end.

The liquid to be treated in tower 11 is pumped through pipe 130 into distributor 132 and out through nozzles 135. These nozzles spray the liquid throughout chamber 25, and the liquid enters passage 90 at the upper edges of plates 75 in the uppermost cubicle 28. This liquid flows along the corrugated major surfaces of all the packing plates to the bottom of the tower.

In this example, the gas, such as air with or without digester gases or the like, to be brought into contact with the liquid is directed through a large gas inlet 140 in tower wall 17 near the top thereof. This gas enters chamber 25 and flows downwardly through passages 90 between the packing plates. As these passages are very thin, the gas comes into intimate contact with all of the liquid flowing downwardly over the plate surfaces. As these passages are undulating, the gas is turbulently directed back and forth against the plate surfaces so that a very intimate and continuous contact is maintained between the gas and the liquid. If the plate surfaces are roughened, considerable turbulence is created in the liquid, thereby increasing the liquid surface in direct contact with the gas.

The sump 30 is at the bottom of tower 11 below the lowermost cubicle 28 so that the liquid and gas pass from the thin passages between the packing plates into this area. The liquid and gas are removed from the sump in any desired manner.

In this example, sump 30 opens throughout the height thereof laterally at 145 into the space between towers 11 and 12. Walls 147 and 148 extend between the towers for the full height thereof from slab 13 to form a separating chamber 150 therebetween. This chamber is provided with a top 152 from which an exhaust stack 153 extends. A plurality of cross braces 155 may extend between towers 11 and 12 near the side walls thereof, there being a pair of these braces near the bottom of each lower cubicle 44. When it is desired to insert or remove packing plates from the cubicles, temporary decking may be placed across these braces to form a platform upon which the workers may stand. Access can be gained to chamber 150 by removing top 152.

Tower 12 is the same as tower 11, and it is loaded with packing plates similar to plates 75 and 112 of tower 11. Tower 12 has a gas inlet 158 at the top thereof as well as a pipe 160 which extends to a distributor in the distributor chamber at the top of the tower. The sump at the bottom of tower 12 also opens into separating chamber 150. Sill 32 is common to both towers, and a baffle plate 162 extends upwardly from said sill midway between the towers to separate the liquid at the bottom of the two towers. A pipe 165 communicates with the bottom of sump 30 of tower 11 and a pump 166 connected to this pipe may direct liquor out of the apparatus or, as desired, pipe 165 may extend to inlet pipe 160 of tower 12 so that the liquid is again brought into intimate contact with a gas. Another pipe 170 communicates with the sump at the bottom of tower 12 and directs the liquid wherever desired, such as to a storage tank. Baffle 162 is required only if the liquid from tower 11 is to be taken to the top of tower 12. Otherwise, either pipe 165 or 170 is all that is necessary to move the liquid from both towers. An emergency overflow pipe 172 communicates with the bottom of the sump of either tower, and a stand pipe 173 extends upwardly from pipe 172 and has an outlet 174 just below the level of the lowermost packing plates. This outlet is connected either to a sewer or storage tank. Pipe 172 and stand pipe 173 are required in case something happens to the system for removing liquid from the bottom of the towers. A drain valve 176 may be provided in pipe 172, the lowest point of the liquid circulating system.

Any foam created at the bottom of towers 11 and 12 passes from the sumps thereof into separating chamber 150. However, this chamber is very high so that there is very little, if any, possibility of the foam being carried by the gas out of the apparatus through exhaust stack 153. However, it is desirable to remove foam from the tower sumps. For this purpose, a slotted pipe 180 extends across the bottom part of separating chamber 150 above baffle 162. This pipe extends out of chamber 150 through wall 147. Pipe 180 is connected to another pipe 181 extending to a pump 182 which draws foam out of the bottom of the towers and directs it to a liquor separator 183, which preferably is a cyclone type of separator. The separated liquid is directed to a suitable storage tank.

The operation of apparatus 10 is as follows: liquid, such as black liquor, is directed into the top of tower 11 through pipe 130 and is sprayed by distributor 132 on to the upper edges of packing plate 75 in the uppermost cubicle 28. This liquid flows over the major surfaces of the plates in a turbulent manner. The liquid flows off the lower edges of plates 75 and on to the upper edges of plates 112 arranged substantially at right angles to said plates 75. In other words, there is a redistribution of the liquid from the upper plates to the lower plates. The liquid now flows in a turbulent manner over the major surfaces of plates 112. Thus, the liquid flows alternately over plates 75 and 112 until it reaches sump 30. At the same time, an oxygen-containing gas, such as air, with or without digester gases or the like, is directed into the top of tower 11 through inlet 140. This air travels downwardly through the undulating passages 90 between plates 75 and the undulating passages between plates 112 to the bottom of the tower. The undulations of the passages create turbulence in the gas flow and bring the gas into very intimate contact with the turbulent liquid flowing over the plate surfaces. As the plates are thin and very closely packed together, the liquid is spread out over an extremely large total surface area in a comparatively small space. As a result of this, it is impossible for any of the liquid to get through the tower without coming into contact with the gas for a comparatively long time.

The gas on reaching the lower end of the tower flows upwardly through separating chamber 150, leaving any foam behind, and passes out of the apparatus through stack 153. The liquid is pumped from sump 30 either out of the apparatus or to the pipe 160 of tower 12, whence it flows between the packing plates of said tower and is brought into intimate contact with gas entering the tower through inlet 158. The liquid is removed from the sump at the bottom of tower 12 through pipe 170.

Foam is removed from the bottom of chamber 150 through slotted pipe 180. This foam is drawn out of pump 182 which directs it to separator 183, and the separated liquid is directed to a suitable storage tank.

As previously stated, the liquid may be pumped from the bottom of both towers to storage or any other desired destination, in which case, the illustrated tower set-up merely has in effect a common sump, separating chamber and exhaust stack. One tower alone may be used, or a pair of towers may be connected up in parallel or series, or a plurality of towers may be arranged in batteries.

What we claim as our invention is:

1. Gas-liquid contacting apparatus comprising a tower including opposed side and opposed end walls and having at least one cubicle therein, a normally-closed entrance in an end wall for the cubicle, a pair of horizontal brackets mounted on and extending inwardly a little from opposed walls of the tower near the bottom of said cubicle, a plurality of thin vertical independent closely-packed and spaced horizontally-corrugated plates extending across the tower and freely resting on said brackets, spacer strips freely mounted between said plates at the edges thereof, thin spacer means for keeping the plates clear of the tower side walls and the end wall opposed to the end wall with the entrance therein, means near the cubicle entrance for releasably clamping the plates and spacer strips together on said brackets with the corrugations of each plate fitting into the corrugations of the next adjacent plate to form thin undulating unobstructed passages between the plates, said plates being individually removable through the cubicle entrance when the clamping means is released, means in the tower for distributing a liquid over the major surfaces of the plates at the upper edges thereof, said liquid flowing down over said surfaces of the plates, and means for directing a gas through the undulating passages wherein said gas is turbulently directed against and maintained in intimate contact with the liquid flowing over the plate surfaces.

2. Gas-liquid contacting apparatus comprising a tower including opposed side and opposed end walls and divided into at least an upper and a lower cubicle, a normally-closed entrance in an end wall for each cubicle, a pair of horizontal brackets mounted on and extending inwardly a little from the opposed side walls of the upper cubicle near the bottom of the latter, thin horizontal spacers on the side walls in the upper cubicle, thin vertical spacers on the end wall opposed to the entrance of the upper cubicle, a pair of horizontal brackets mounted on and extending inwardly a little from the opposed side walls of the lower cubicle, at least one thin horizontal spacer on the end wall opposed to the entrance of the lower cubicle, a plurality of thin vertical independent closely-packed and spaced horizontally-corrugated plates extending across the tower and freely resting on the brackets of each cubicle, the plates in the upper cubicle extending substantially at right angles to the plates of the lower cubicle with lower edges of the upper plates closely adjacent upper edges of the lower plates, spacer strips freely mounted between the plates at the edges thereof of each cubicle, means near the entrance of each cubicle for releasably clamping the plates and spacer strips of the latter cubicle together on the cubicle brackets with the corrugations of each plate fitting into the corrugations of the next adjacent plate to form thin undulating unobstructed passages between the plates, said plates being individually removable through the respective cubicle entrances when the clamping means are released, means in the tower for distributing a liquid over the major surfaces of the plates at the upper edges thereof, said liquid flowing down over said surfaces of the plates, and means for directing a gas through the undulating passages wherein said gas is turbulently directed against and maintained in intimate contact with the liquid flowing over the plate surfaces.

References Cited in the file of this patent

UNITED STATES PATENTS

| | | |
|---|---|---|
| 1,549,068 | Dickey | Aug. 11, 1925 |
| 2,303,157 | Bush | Nov. 24, 1942 |
| 2,430,707 | Cahn | Nov. 11, 1947 |
| 2,485,849 | Simmons | Oct. 25, 1949 |
| 2,573,491 | Richardson | Oct. 30, 1951 |
| 2,703,015 | Sykes | Mar. 1, 1955 |
| 2,783,982 | Kahl | Mar. 5, 1957 |
| 2,858,119 | Wright et al. | Oct. 28, 1958 |
| 2,859,766 | Shuldener | Nov. 11, 1958 |

FOREIGN PATENTS

| | | |
|---|---|---|
| 13,222 | Great Britain | June 11, 1904 |
| 571,510 | Great Britain | Aug. 28, 1945 |